No. 850,320. PATENTED APR. 16, 1907.
F. ROEDER.
METHOD OF TRANSFERRING SHIPS OR VESSELS.
APPLICATION FILED JAN. 15, 1906.
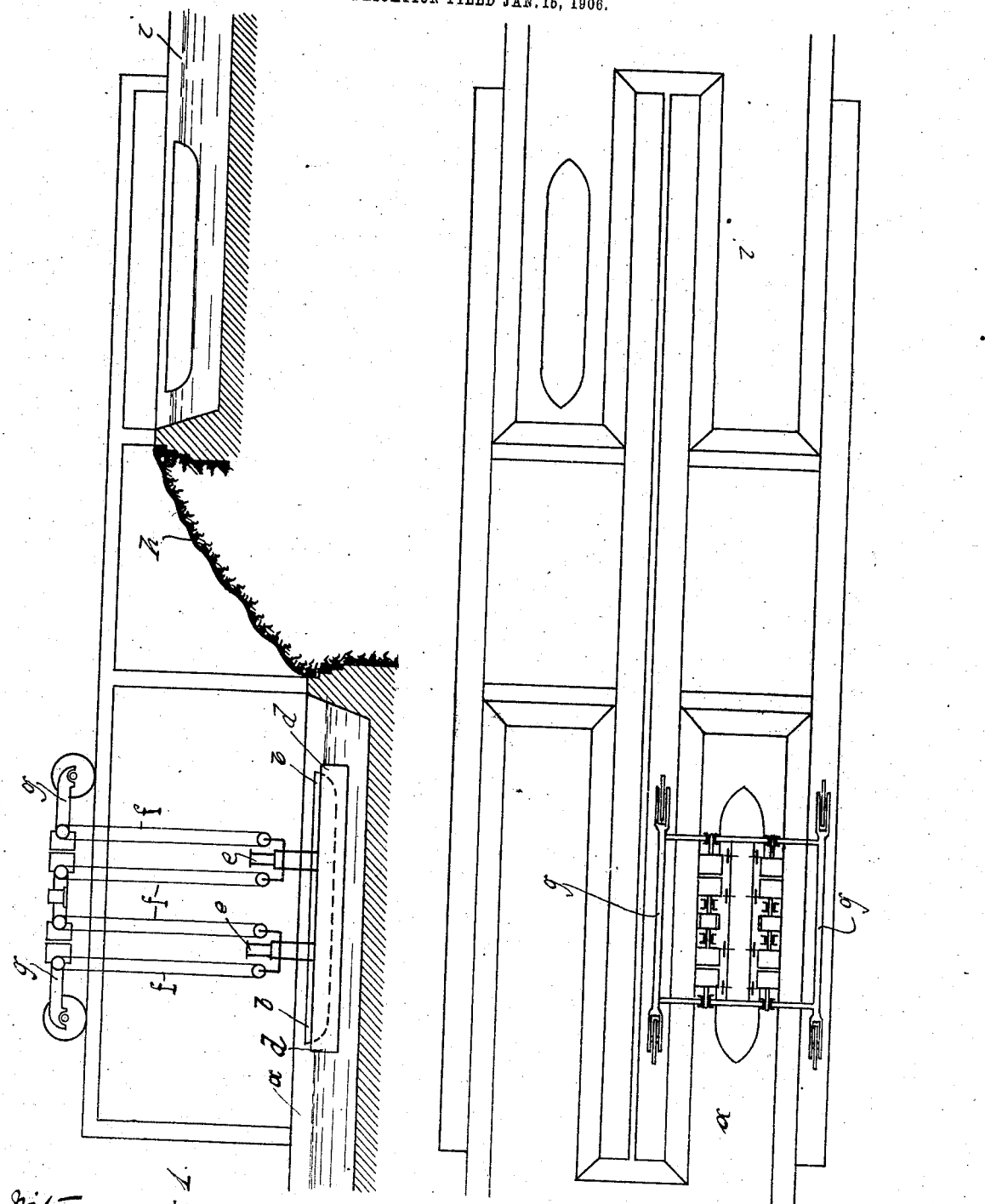

UNITED STATES PATENT OFFICE.

FRANZ ROEDER, OF WIESBADEN, GERMANY, ASSIGNOR OF ONE-HALF TO THE FELTEN & GUILLEAUME LAHMEYERWERKE, A. G., OF FRANKFORT-ON-THE-MAIN, GERMANY.

METHOD OF TRANSFERRING SHIPS OR VESSELS.

No. 850,320.     Specification of Letters Patent.     Patented April 16, 1907.

Application filed January 15, 1906. Serial No. 296,158.

*To all whom it may concern:*

Be it known that I, FRANZ ROEDER, a subject of the German Emperor, and a resident of Wiesbaden, Germany, have invented certain new and useful Improvements in the Methods of Transferring of Ships or Vessels, of which the following is a specification.

The present invention has for an object a method of transferring ships or vessels from one body of water at a lower level to another body of water at a higher level, and vice versa.

According to the present invention only the ship or vessel, together with its supporting device, is lifted or lowered, while the carriage, with its motors and machinery, is not at all or only slightly lifted or lowered, but is moved bodily on a horizontal or only slightly inclined viaduct the level of which is above the level of the upper water.

The mode of proceeding is as follows: In the lower water $a$ the ship or vessel $b$ is brought through one of the two open gates into the sluice-chamber $d$, thereby pushing the water out of the chamber through the other open gate. The ship or vessel having reached the middle position, the gates at both ends of the chamber are closed, and the windlasses $e$ are set in motion. Ropes, chains, or the like may be used as supporting and bearing means. The ship or vessel having been lifted sufficiently the windlasses $e$ are stopped, and the motors G are operated to move the carriage $g$, together with the chamber $d$, in a practically horizontal direction over the intervening embankment $h$ to a position over the upper water $i$, where the chamber $d$ is lowered by the windlasses into the upper water $i$.

For insuring a uniform tension of all ropes and chains and also for keeping the sluice-chamber always in a horizontal position well-known means—pressure-cylinders, air-bellows, &c.—are interposed between the chamber and the bearing means.

If electricity is used as energy, it may be generated in the motors, which are switched as generators, and may be stored in batteries or in balance-wheel transformers.

In some cases two of these ship lifting and transferring devices could be provided in order that the energy (for instance, electricity) generated in the motor-generators of the downward-going sluice-chamber might be used directly for lifting purposes. However, it is possible to operate each chamber by itself. Furthermore, the ships or vessels may be transferred in a longitudinal or transverse direction, with or without the water.

I claim—

The method herein described, of transferring ships or vessels from one body of water to another in a different plane, consisting in first floating said ship or vessel in a suitable chamber in one body of water, then raising said chamber and contents, then moving said chamber and contents approximately horizontally until the same is suspended over the other body of water, then lowering said chamber and contents into said other body of water, and releasing said ship or vessel from said chamber.

In testimony whereof I have signed my name to this specification in the presence of two subscribing witnesses.

FRANZ ROEDER.

Witnesses:
   JEAN GRUND,
   MICHAEL VOLK.